(12) United States Patent
Vlaming

(10) Patent No.: US 10,974,901 B1
(45) Date of Patent: Apr. 13, 2021

(54) CONTAINER EXTRACTION ASSEMBLY

(71) Applicant: Driessen Aerospace Group N.V., Alkmaar (NL)

(72) Inventor: Paul Cornelis Vlaming, Alkmaar (NL)

(73) Assignee: SAFRAN CABIN NETHERLANDS N.V., Alkmaar (NL)

(*) Notice: Subject to any disclaimer, the term of this patent is extended or adjusted under 35 U.S.C. 154(b) by 0 days.

(21) Appl. No.: 16/626,496

(22) PCT Filed: Jul. 17, 2019

(86) PCT No.: PCT/US2019/042241
§ 371 (c)(1),
(2) Date: Dec. 24, 2019

(87) PCT Pub. No.: WO2020/018692
PCT Pub. Date: Jan. 23, 2020

Related U.S. Application Data

(60) Provisional application No. 62/699,616, filed on Jul. 17, 2018.

(51) Int. Cl.
*B65G 1/14* (2006.01)
*B64D 11/04* (2006.01)
*B25J 1/04* (2006.01)

(52) U.S. Cl.
CPC ............... *B65G 1/14* (2013.01); *B25J 1/04* (2013.01); *B64D 11/04* (2013.01)

(58) Field of Classification Search
CPC .... A47B 96/00; B25J 1/04; B25J 1/08; B64D 11/04; B65G 7/02; B65G 1/06; B66F 19/00; A47F 1/125; A47F 1/126; A47F 13/06
See application file for complete search history.

(56) References Cited

U.S. PATENT DOCUMENTS

| 9,199,738 | B2 | 12/2015 | Tan et al. |
| 9,215,929 | B2 * | 12/2015 | Brunnmayr .......... A47B 88/457 |

(Continued)

FOREIGN PATENT DOCUMENTS

WO    2017191202    11/2017

OTHER PUBLICATIONS

International Search Report and Written Opinion issued in PCT/US19/42241.

*Primary Examiner* — Kaitlin S Joerger
(74) *Attorney, Agent, or Firm* — Jeffer Mangels; Butler & Mitchell LLP; Brennan C. Swain, Esq.

(57) ABSTRACT

A container extraction assembly that includes an extractor assembly and a retainer assembly. The extractor assembly includes a pull member and an extractor member. The extractor member is movable between a distal position and a proximal position and the pull member is movable between first, second third positions. Moving the pull member from the first position to the third position moves the extractor member from the distal to the proximal position. The retainer assembly includes a proximal leg member and a distal leg member that are hingedly connected to one another. The retainer assembly is movable between a deployed position, a folded position and a finish position. Moving the pull member from the first position to the second position moves the retainer assembly from the deployed to the folded position, and moving the pull member from the second position to the third position moves the retainer assembly from the folded to the finish position.

14 Claims, 6 Drawing Sheets

(56) References Cited

U.S. PATENT DOCUMENTS

| | | | |
|---|---|---|---|
| 10,315,304 B1* | 6/2019 | Cowan | ............ B25H 5/00 |
| 10,710,858 B2* | 7/2020 | Rechberg | ......... B64D 11/04 |
| 2010/0060021 A1 | 3/2010 | Pouliot et al. | |
| 2012/0014627 A1 | 1/2012 | Rehage et al. | |
| 2013/0241382 A1 | 9/2013 | Wilkinson et al. | |
| 2014/0166806 A1* | 6/2014 | Durand | ........... B64D 11/04 |
| | | | 244/118.1 |
| 2017/0166310 A1 | 6/2017 | Wallbott et al. | |

* cited by examiner

CONTAINER EXTRACTION ASSEMBLY

CROSS REFERENCE TO RELATED APPLICATIONS

This application is a national stage application, filed under 35 U.S.C. § 371, of International Patent Application No. PCT/US19/42241, filed Jul. 17, 2019, which claims the benefit of U.S. Provisional Application No. 62/699,616, filed Jul. 17, 2018, the entireties of which are incorporated herein by reference.

FIELD OF THE INVENTION

The present invention relates generally to a pull activated unfolding lock for use in an aircraft galley.

BACKGROUND OF THE INVENTION

During meal service an intermediate retainer typically keeps the second or third row of equipment in place. The current intermediate retainer is often difficult to operate due to the small knob which has to be turned. It is also often difficult to visually see the difference between the locked and unlocked positions as the retainer itself is often out of view due to the positioning of or stowed rotable equipment. The present invention overcomes the difficulties discussed above.

SUMMARY OF THE PREFERRED EMBODIMENTS

In accordance with a first aspect of the present invention there is provided a container extraction assembly that includes an extractor assembly that includes a pull member and an extractor member. The extractor member is movable between a distal position and a proximal position and the pull member is movable between a first position, a second position and a third position. Moving the pull member from the first position to the third position moves the extractor member from the distal position to the proximal position. The retainer assembly includes a proximal leg member and a distal leg member that are hingedly connected to one another. The retainer assembly is movable between a deployed position, a folded position and a finish position. Moving the pull member from the first position to the second position moves the retainer assembly from the deployed position to the folded position, and moving the pull member from the second position to the third position moves the retainer assembly from the folded position to the finish position. In a preferred embodiment, the proximal leg member has a first end and a second end, the first end is hingedly connected to the distal leg member, and the second end pivots between the deployed position and the folded position (and may move upwardly in an embodiment with the first and second protrusions discussed herein). Preferably, the second end of the proximal leg member slides (i.e., moves linearly toward the proximal end of the container extraction assembly) between the folded position and the finish position. In a preferred embodiment, the distal leg member has a first end and a second end, the first end is hingedly connected to the first end of the proximal leg member, and the second end pivots and slides (i.e., moves linearly toward the proximal end of the container extraction assembly) between the deployed position and the folded position.

In a preferred embodiment, the pull member is operatively connected to the second end of the distal leg member. Preferably, the retainer assembly is biased to the deployed position and the extractor member is biased to the distal position. In a preferred embodiment, the container extraction assembly includes a housing that includes first and second slots defined therein. The second end of the proximal leg member is movable along the first slot, and the second end of the distal leg member is movable along the second slot. Preferably, the first slot includes a recess (or both first slots on opposite sides each include a recess), and the second end of the proximal leg member (or the hinge pin associated therewith) is received in the recess when the retainer assembly is in the deployed position.

In a preferred embodiment, the proximal leg member includes a first protrusion on an inside surface and the distal leg member includes a second protrusion on an inside surface. As the retainer assembly moves from the deployed position to the folded position the first and second protrusions come into contact and the second end of the proximal leg member moves upwardly and out of the recess.

In accordance with another aspect of the present invention there is provided a container extraction assembly that includes an extractor assembly and a retainer assembly. The extractor assembly includes a pull member and an extractor member. The extractor member is movable between a distal position and a proximal position, and the pull member is movable between a first position, a second position and a third position. Moving the pull member from the first position to the third position moves the extractor member from the distal position to the proximal position. The retainer assembly includes a proximal leg member and a distal leg member that are hingedly connected to one another. The retainer assembly is movable between a deployed position, a folded position and a finish position. Moving the pull member from the first position to the second position moves the retainer assembly from the deployed position to the folded position. Moving the pull member from the second position to the third position moves the retainer assembly from the folded position to the finish position. The proximal leg member has a first end and a second end, and the distal leg member has a first end and a second end. The first end of the proximal leg member is hingedly connected to the first end of the distal leg member. The second end of the proximal leg member pivots between the deployed position and the folded position, and the second end of the distal leg member pivots and slides between the deployed position and the folded position. The second end of the proximal leg member slides between the folded position and the finish position and the second end of the distal leg member slides between the folded position and the finish position.

In accordance with another aspect of the present invention there is provided a method of moving first and second objects that are positioned in front and rear storage spaces. The method includes moving the first object out of the front storage space, moving a pull member from a first position to a second position, thereby causing a retainer assembly to move from a deployed position to a folded position and an extractor member to move away from a distal position, and moving the pull member from the second position to a third position, thereby causing the retainer assembly to move from the folded position to a finish position and the extractor member to move to a proximal position. As the extractor member moves to the proximal position, the second object is moved from the rear storage space to the front storage space. Lastly, the method includes moving the second object out of the front storage space.

The present invention is an assembly for both extracting a second row or further standard container in a galley and securing the standard container in place after removing the first row container. The device enables the intermediate retainer or retainer assembly to move, fold and/or stow when the slide extractor or extractor member is moved or pulled.

In use, front and intermediate or proximal and distal standard containers or other pieces of equipment or objects are stored in the compartment of the galley monument. For ease of description, some of the components herein are referred to herein as proximal or proximate and distal. These terms are used as they relate to a user of the system (e.g., a flight attendant). For example, the proximal leg member is positioned closer to the flight attendant and the distal leg member is positioned further from the flight attendant. In use, when the front container is removed, this creates space for the intermediate retainer member to move into place (into the deployed position) because it is biased to the deployed position. By pulling the cord, cable or other pull member that moves the slide extractor member, the intermediate retainer assembly folds against the compartment's outer panels or within a housing. The extractor member and retainer assembly then continue to move toward the user as the pull member is pulled until the container in the back can be reached by the user. The retainer assembly, which acts as the intermediate retainer, includes two legs (proximal and distal) and can also include a slider member that are connected by hinges.

The assembly or adapter piece contains three sets of rails. One of the rails is shaped in such a way so the hinge running inside (on the proximal leg of the retainer assembly) can only move in one direction (toward the user) and is locked when trying to do the opposite. The lower two rails or slots contain the second end of the distal leg member and the extractor member and/or sledge.

The hinge pin on the proximal leg provides the locking characteristic when the standard container is being retained in place because the hinge pin is retained in a channel. When folding down, the two protrusions located on the inside of the two legs come into contact and dislodge the proximal leg hinge pin from the channel, thus allowing the entire retainer assembly to slide toward the user as the container is pulled by the extractor member.

It will be appreciated that the embodiment described herein has been designed for the standard unit compartment in a galley. However, the combination of intermediate retainer and slide extractor can also be applied to the trolley compartment in the galley monument or to other situations where a second object is positioned behind a first object.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
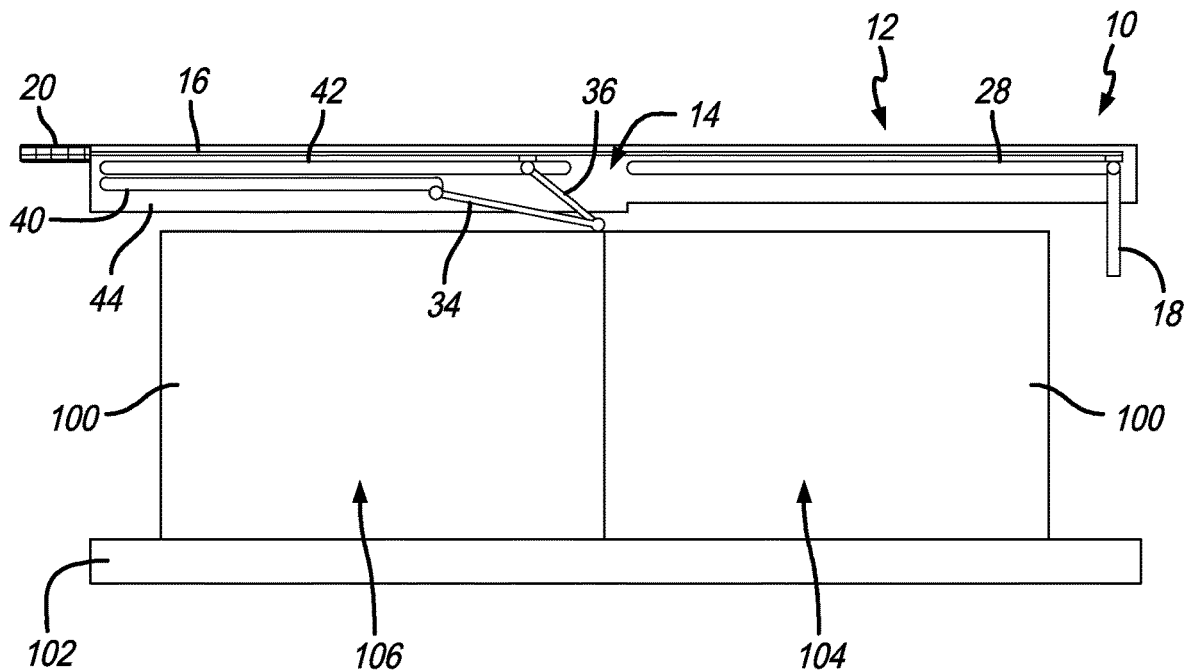
FIG. 1 is a schematic side elevational view of a container extraction assembly showing the retainer assembly in the pre-deployed position in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the FIGS. 1-8 show a container extraction assembly 10 that can be used, for example, in the galley of an aircraft. Generally, the container extraction assembly 10 includes an extractor assembly 12 and a retainer assembly 14.

Figure 3:
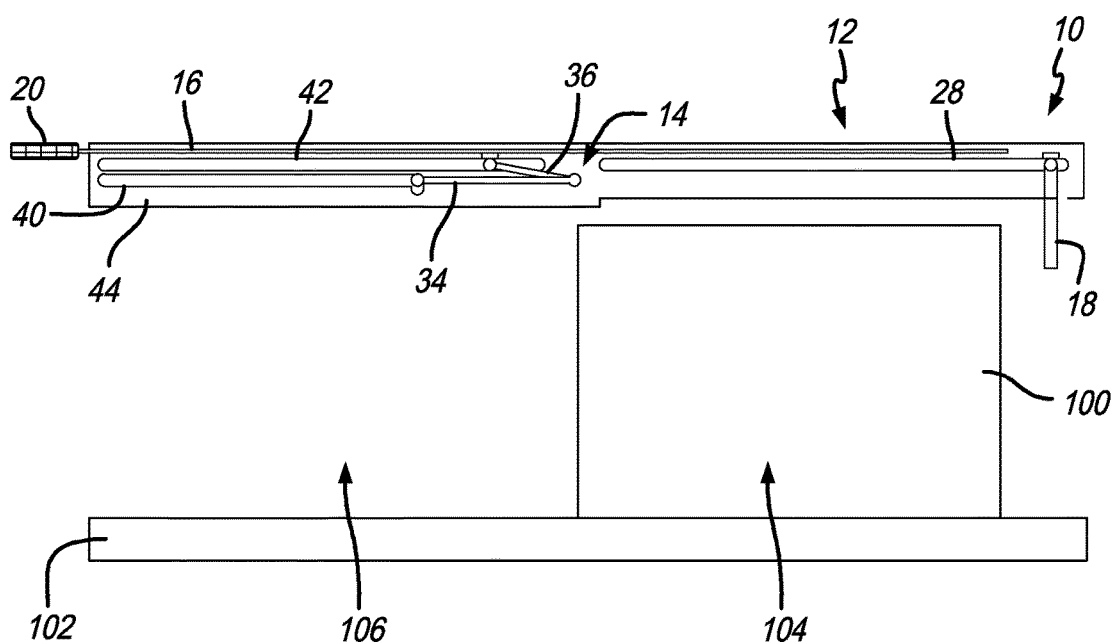
FIG. 3 is a schematic side elevational view of the container extraction assembly showing the retainer assembly in the folded position.
Figure 4:
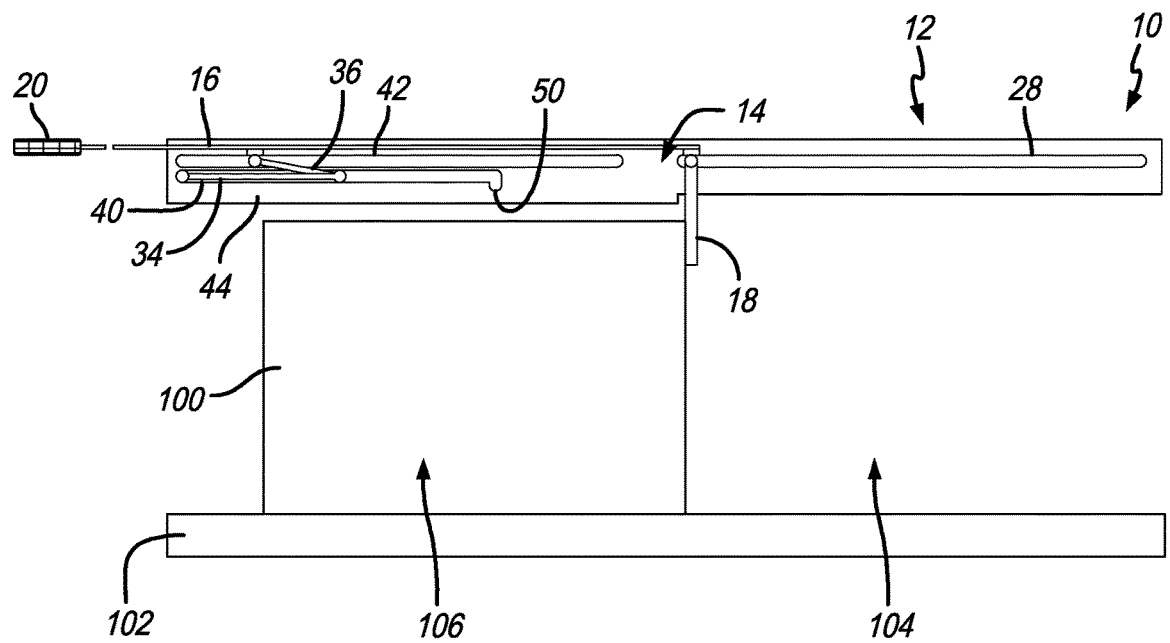
FIG. 4 is a schematic side elevational view of the container extraction assembly showing the retainer assembly in the finish position.

As shown in FIG. 1, the extractor assembly 12 includes a pull member 16 and an extractor member 18. It will be appreciated by those of ordinary skill in the art that the extractor member 18 is used to pull a standard container 100 from a distal position or rear storage space 104 to a proximal position or front storage space 106 so that it can be removed from the storage space or shelf 102 by a user. In order to do this, the pull member 16 can be pulled by a user to move the extractor member 18 from a distal position to a proximal position (as shown in FIGS. 3 and 4). In a preferred embodiment, the pull member 16 includes a handle 20.

FIGS. 1-4 show the retainer assembly 14 and extractor member 18 extending downwardly to secure the standard container 100 in place. However, the retainer assembly 14 can be oriented such that the retainer assembly 14 and extractor member 18 extend upwardly or sideways. Any orientation given in the claims refers to the orientation shown in the drawings. However, this should not be considered limiting. For example, if the assembly 10 were employed such that the retainer assembly 14 extended upwardly (see, e.g., FIG. 8) to secure objects in place, the claims still would cover such an employment.

Figure 5:
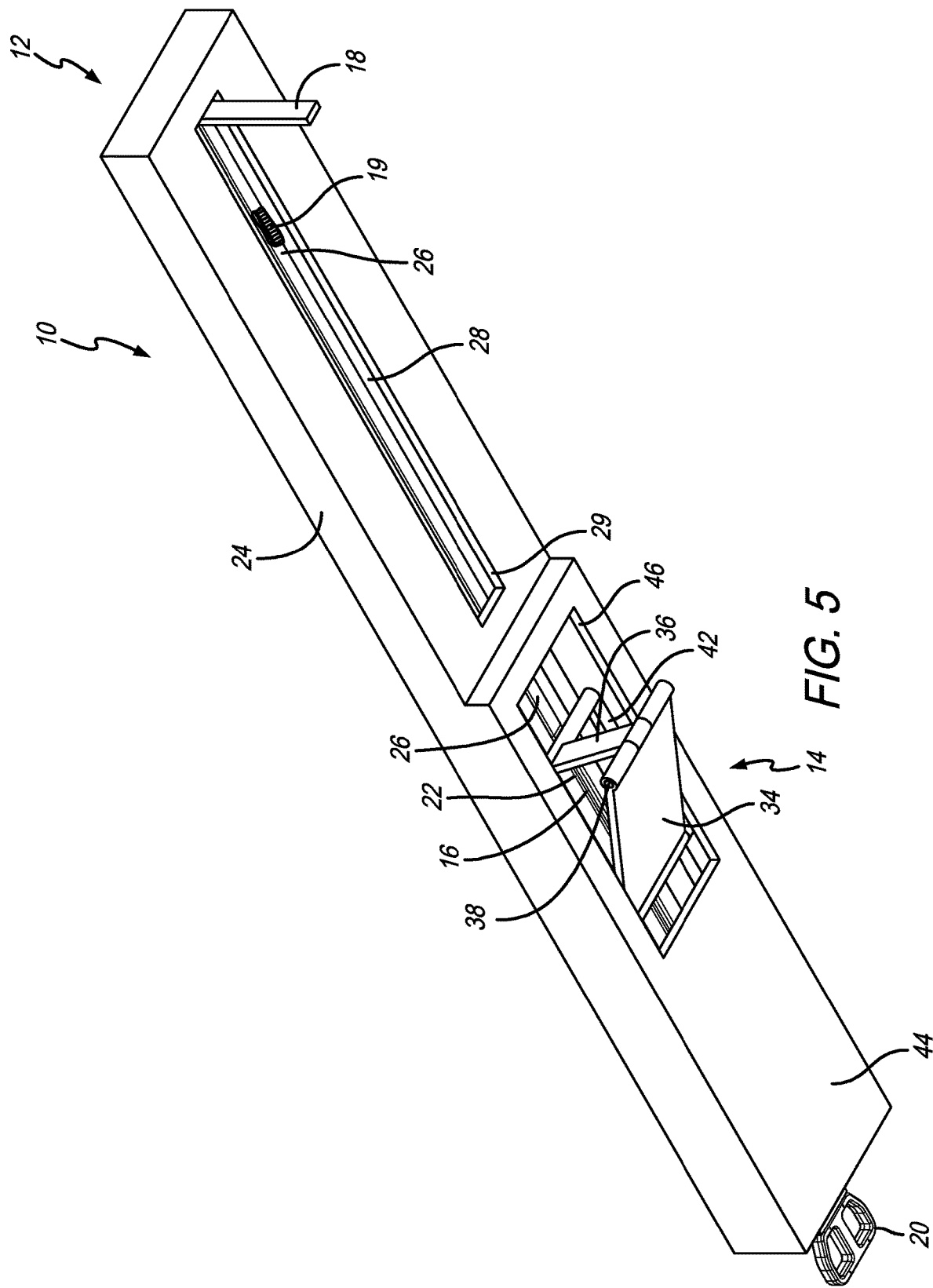
FIG. 5 is a perspective view of the container extraction assembly with the retainer assembly in the deployed position.

In a preferred embodiment, the pull member 16 is biased to the first position (where the extractor member 18 is in the distal position). As shown in FIG. 5, a portion of the pull member 16 includes a spring 19 for pulling the extractor member 18 back to the distal or home position. The pull member 16 can be a cable, cord, metal strip or the like and can also include the spring 19. The pull member 16 resides in a channel 22 defined in the main body portion 24 of the extractor assembly 12. A sledge 26 can cover a portion of the pull member 16 (e.g., the spring 19, as shown in the small cutaway in FIG. 5). Note, the spring is not shown in FIGS. 1-4. The sledge 26 travels with the extractor member 18. Slots 28 can be defined in the sides of the channel 22 that guide the extractor member 18 as it moves from the distal position to the proximal position. Preferably, the main body portion 24 also includes a slot 29 in which the extractor member 18 moves. In another embodiment, the main body portion of the extractor assembly can be a wall or the like into which the container extraction assembly 10 is built.

The pull member 16 is movable between a first position, a second position and a third position and moving the pull member from the first position to the third position moves the extractor member from the distal position to the proximal position. The second position of the pull member 16 will be described below.

The retainer assembly 14 includes a proximal leg member 34 and a distal leg member 36 that are hingedly connected to one another (see hinge pin 38 in FIG. 5). The retainer assembly 14 is movable between a deployed position (see FIGS. 2 and 5), a folded position (see FIGS. 3 and 6) and a finish position (see FIGS. 4 and 7). It will be understood that moving the pull member 16 from the first position to the second position moves the retainer assembly 14 from the deployed position to the folded position, and moving the pull member 16 from the second position to the third position moves the retainer assembly 14 from the folded position to the finish position.

Figure 8:
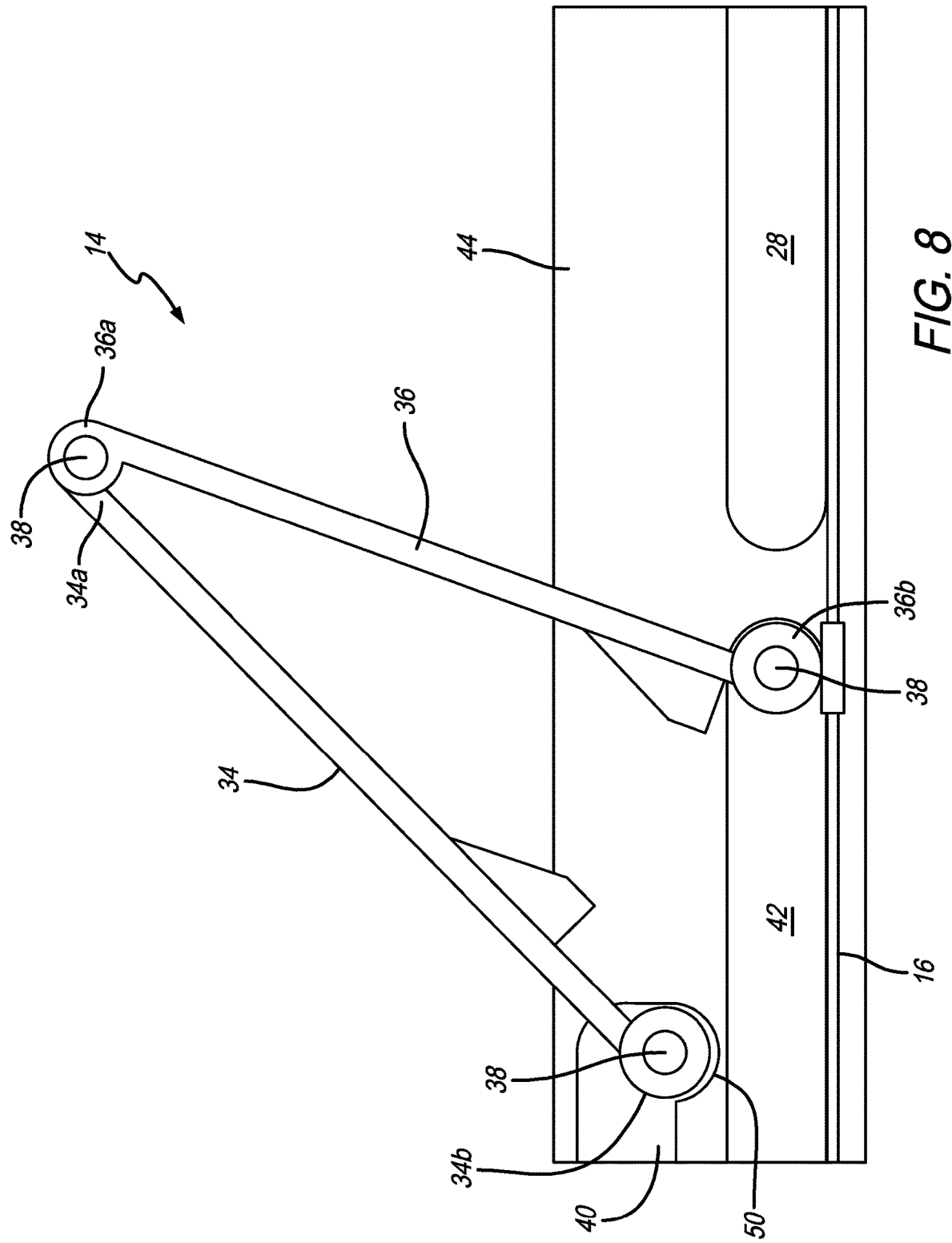
FIG. 8 is a side elevational view of the retainer assembly.

As is best shown in FIG. 8, in a preferred embodiment, the proximal leg member 34 has a first end 34a and a second end 34b. The first end 34a of the proximal leg member 34 is hingedly connected to the distal leg member 36, and the second end 34b pivots between the deployed position and the folded position. The second end 34b then slides between the folded position and the finish position (see FIG. 4). The distal leg member 36 has a first end 36a and a second end 36b. The first end 36a is hingedly connected to the first end 34a of the proximal leg member 34 and the second end 36b pivots and slides between the deployed position and the folded position because the pull member 16 is pulling the second end 36b toward the proximal end of the container extraction assembly 10. This action is what causes the retainer assembly 14 to fold or collapse.

In a preferred embodiment, the second ends 34a and 36a of the proximal and distal leg members 34 and 36 are contained in first and second slots 40 and 42, respectively. Preferably, the ends include hinge pins 38 that extend into the first and second slots 40 and 42 and allow the proximal and distal leg members 34 and 36 to pivot or hinge and slide along the first and second slots 40 and 42. In another embodiment, the slots and pins or protrusions arrangement can be reversed. For example, rails can extend inwardly from the sidewalls and rollers can be included on which the retainer assembly moves or slides (sliding meaning linear movement). Preferably, the retainer assembly 14 is biased to the deployed position. For example, a hinge spring can be used around the hinge pin 38.

Figure 6:
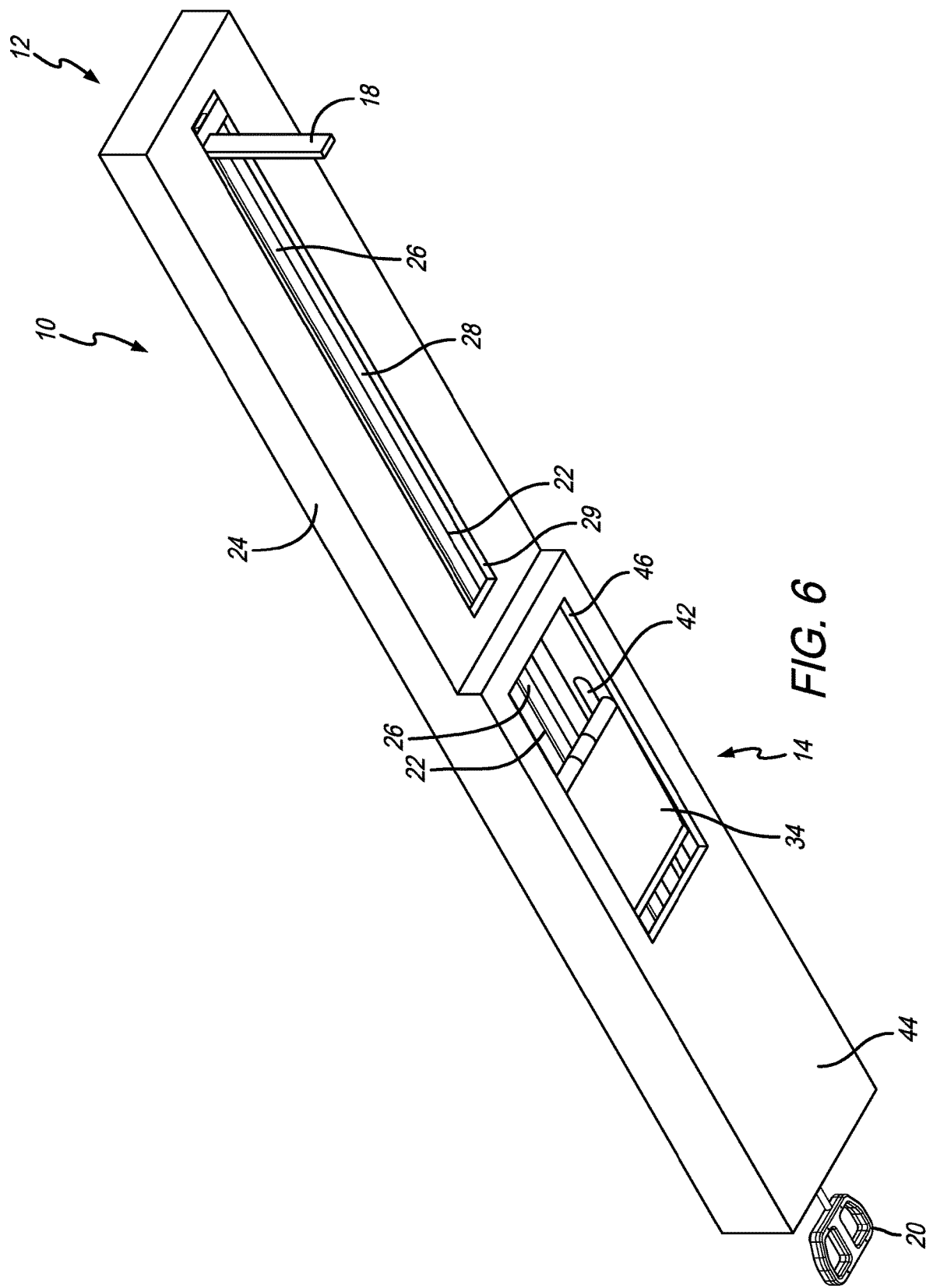
FIG. 6 is a perspective view of the container extraction assembly with the retainer assembly in the folded position.
Figure 7:
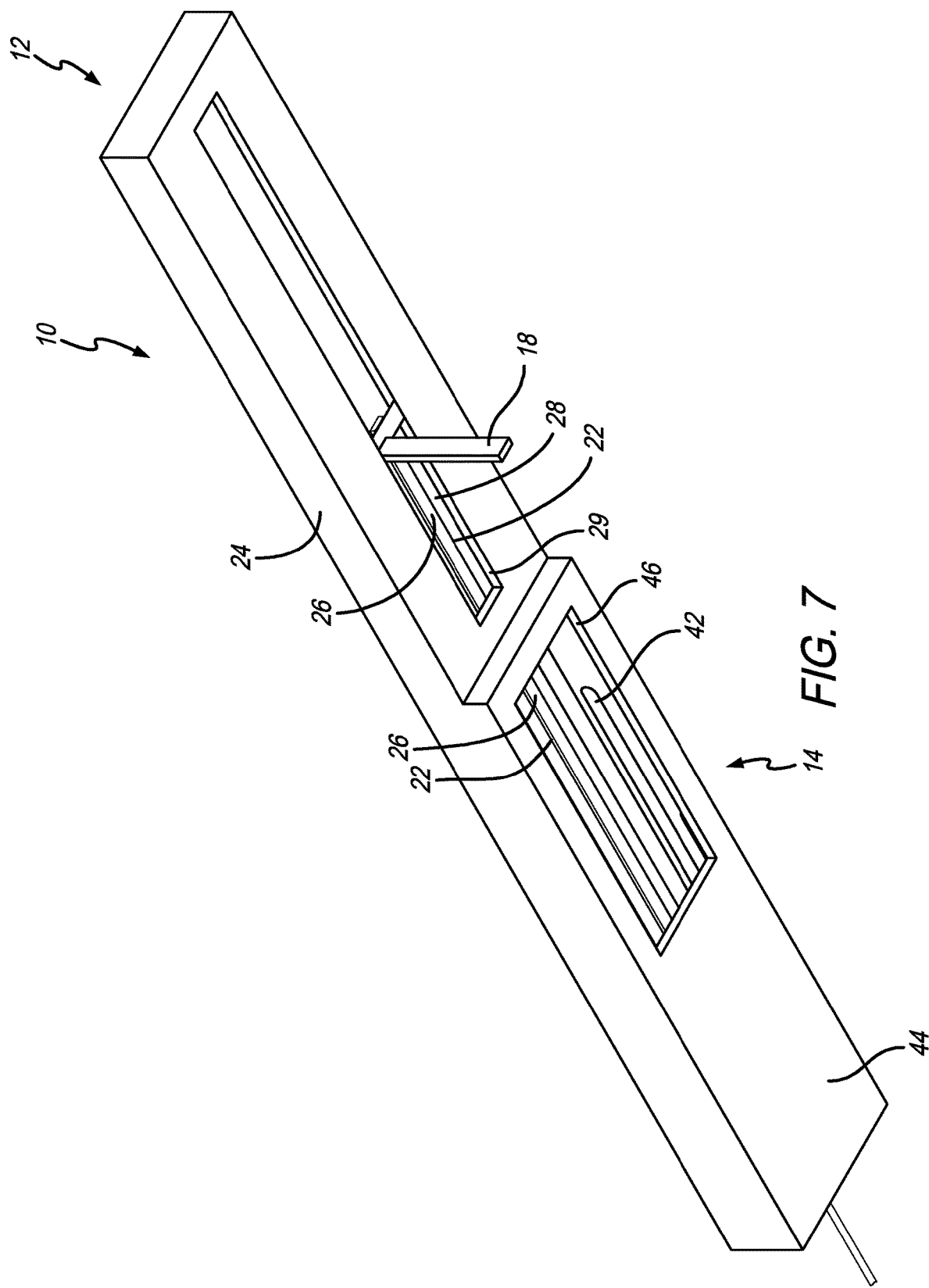
FIG. 7 is a perspective view of the container extraction assembly with the retainer assembly in the finish position.

As shown in FIGS. 5-7, in a preferred embodiment, the container extraction assembly 10 includes a housing 44 having an opening 46. First and second slots 40 and 42 are defined in the sidewalls of the housing 44. Housing 44 defines a housing interior 48 in which the retainer assembly 14 can move or slide. Opening 46 allows the retainer assembly 14 to extend outwardly in the deployed position (see FIG. 5) so that it can secure a standard container 100 in position.

Figure 2:
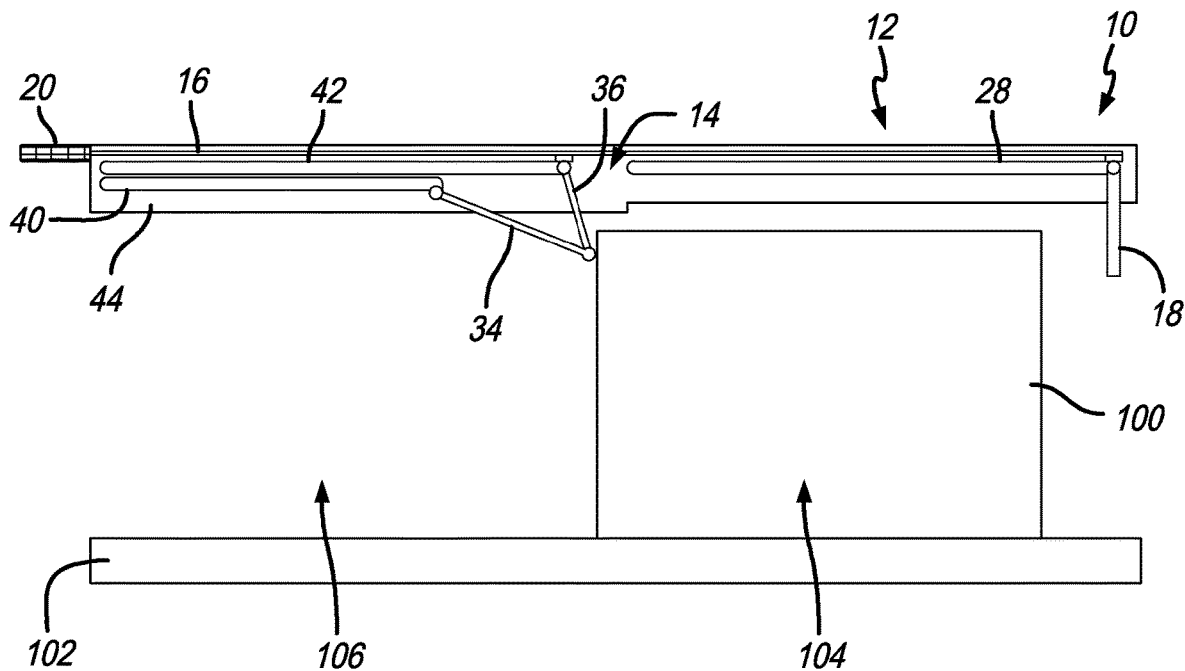
FIG. 2 is a schematic side elevational view of the container extraction assembly showing the retainer assembly in the deployed position.

As shown in FIG. 8, in a preferred embodiment, the first slot 40 on each side includes a recess 50 that receives the second end 34a of proximal leg member 34 when it is in the deployed position (see also FIG. 2). Preferably, the proximal and distal leg members 34 and 36 include protrusions 52 and 54 on the inside surfaces thereof. As the retainer assembly 14 moves to the folded position, the two protrusions 52 and 54 come into contact and (due to the incline) dislodge hinge pin of the proximal leg member 34 from the recess 50, thus allowing the entire retainer assembly 14 to slide toward the user as the container 100 is pulled by the extractor member 18.

FIG. 1 shows the retainer assembly 14 in the pre-deployed position. In this position, the retainer assembly 14 is against the standard container 100 in the front storage space 106 and is partially collapsed. When the standard container 100 in the front storage space 106 is removed, because the retainer assembly 14 is biased to the deployed position it moves to the deployed position, as shown in FIG. 2 and maintains the storage container in the rear storage space 104 in position. FIG. 5 also shows the retainer assembly 14 in the deployed position. When a user wants to access the standard container 100 in the rear storage space 104 they pull on handle 20, which begins pulling pull member 16 from the first position. As the pull member 16 reaches the second position the retainer member 14 collapses or folds to the folded position (due to the pull member 16 pulling the second end 36b of the distal leg member 36), as shown in FIG. 3. FIG. 6 also shows the retainer assembly 14 in the folded position. The retainer assembly 14 is now out of the way of the standard container 100 in the rear storage space 104. As the pull member 16 is pulled further the extractor member 18 contacts the standard container and pulls it forward until the pull member 16 reaches the third position, as shown in FIG. 4. As the pull member 16 (and extractor member 18) travel from the second position to the third position, the retainer assembly 14 travels from the folded position to the finish position. In FIG. 7, the housing 44 obscures the retainer assembly 14 in the finish assembly. However, FIG. 7 shows that the retainer assembly 14 is no longer viewable through opening 46. It should be appreciated that when a standard container 100 is pushed back into the rear storage space, due to the inclined nature of the proximal leg member 34, the retainer assembly 14 will be pushed out of the way and partially folded to the pre-deployed position.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A container extraction assembly comprising:
an extractor assembly that includes a pull member and an extractor member, wherein the extractor member is movable between a distal position and a proximal position, wherein the pull member is movable between a first position, a second position and a third position, wherein moving the pull member from the first position to the third position moves the extractor member from the distal position to the proximal position,
a retainer assembly that includes a proximal leg member and a distal leg member that are hingedly connected to one another, wherein the retainer assembly is movable between a deployed position, a folded position and a finish position, wherein moving the pull member from the first position to the second position moves the retainer assembly from the deployed position to the folded position, and wherein moving the pull member from the second position to the third position moves the retainer assembly from the folded position to the finish position.

2. The container extraction assembly of claim 1 wherein the proximal leg member has a first end and a second end, wherein the first end is hingedly connected to the distal leg member, and wherein the second end pivots between the deployed position and the folded position.

3. The container extraction assembly of claim 2 wherein the second end of the proximal leg member slides between the folded position and the finish position.

4. The container extraction assembly of claim 1 wherein the distal leg member has a first end and a second end, wherein the first end is hingedly connected to the first end of the proximal leg member, and wherein the second end pivots and slides between the deployed position and the folded position.

5. The container extraction assembly of claim 1 wherein the pull member is operatively connected to the second end of the distal leg member.

6. The container extraction assembly of claim 1 wherein the retainer assembly is biased to the deployed position and the extractor member is biased to the distal position.

7. The container extraction assembly of claim 1 further comprising a housing that includes first and second slots defined therein, wherein the second end of the proximal leg member is movable along the first slot, and wherein the second end of the distal leg member is movable along the second slot.

8. The container extraction assembly of claim 7 wherein the first slot includes a recess, and wherein the second end of the proximal leg member is received in the recess when the retainer assembly is in the deployed position.

9. The container extraction assembly of claim 1 wherein the proximal leg member has first and second ends, wherein the proximal leg member includes a first protrusion on an inside surface and the distal leg member includes a second protrusion on an inside surface, wherein as the retainer assembly moves from the deployed position to the folded position the first and second protrusions come into contact and the second end of the proximal leg member moves upwardly.

10. A container extraction assembly comprising:
an extractor assembly that includes a pull member and an extractor member, wherein the extractor member is movable between a distal position and a proximal position, wherein the pull member is movable between a first position, a second position and a third position, wherein moving the pull member from the first position to the third position moves the extractor member from the distal position to the proximal position,
a retainer assembly that includes a proximal leg member and a distal leg member that are hingedly connected to one another, wherein the retainer assembly is movable between a deployed position, a folded position and a finish position, wherein moving the pull member from the first position to the second position moves the retainer assembly from the deployed position to the folded position, wherein moving the pull member from the second position to the third position moves the retainer assembly from the folded position to the finish position, wherein the proximal leg member has a first end and a second end, wherein the distal leg member has a first end and a second end, wherein the first end of the proximal leg member is hingedly connected to the first end of the distal leg member, wherein the second end of the proximal leg member pivots between the deployed position and the folded position, wherein the second end of the distal leg member pivots and slides between the deployed position and the folded position, wherein the second end of the proximal leg member slides between the folded position and the finish position and the second end of the distal leg member slides between the folded position and the finish position.

11. The container extraction assembly of claim 10 further comprising a housing that includes first and second slots defined therein, wherein the second end of the proximal leg member is movable along the first slot, and wherein the second end of the distal leg member is movable along the second slot.

12. The container extraction assembly of claim 11 wherein the first slot includes a recess, and wherein the second end of the proximal leg member is received in the recess when the retainer assembly is in the deployed position.

13. The container extraction assembly of claim 12 wherein the proximal leg member has first and second ends, wherein the proximal leg member includes a first protrusion on an inside surface and the distal leg member includes a second protrusion on an inside surface, wherein as the retainer assembly moves from the deployed position to the folded position the first and second protrusions come into contact and the second end of the proximal leg member moves upwardly.

14. A method of moving first and second objects that are positioned in front and rear storage spaces, the method comprising the steps of:
moving the first object out of the front storage space,
moving a pull member from a first position to a second position, thereby causing a retainer assembly to move from a deployed position to a folded position and an extractor member to move away from a distal position,
moving the pull member from the second position to a third position, thereby causing the retainer assembly to move from the folded position to a finish position and the extractor member to move to a proximal position, wherein as the extractor member moves to the proximal position, the second object is moved from the rear storage space to the front storage space, and
moving the second object out of the front storage space.

* * * * *